United States Patent
Bullock (10) Patent No.: US 8,957,334 B1
(45) Date of Patent: Feb. 17, 2015

(54) ILLUMINATION AND VISUAL INDICATOR

(75) Inventor: Scott A. Bullock, Bristol, VA (US)

(73) Assignee: Electro-Mechanical Corporation, Bristol, VA (US)

( * ) Notice: Subject to any disclaimer, the term of this patent is extended or adjusted under 35 U.S.C. 154(b) by 399 days.

(21) Appl. No.: 13/414,327

(22) Filed: Mar. 7, 2012

Related U.S. Application Data (60) Provisional application No. 61/451,416, filed on Mar. 10, 2011.

(51) Int. Cl.
*H01H 9/20* (2006.01)

(52) U.S. Cl.
USPC .................................................. 200/50.26

(58) Field of Classification Search
USPC ............ 200/50.26, 50.2, 50.24, 50.23, 50.27, 200/310, 312, 317, 254–255; 361/727, 726, 361/642; 439/310, 372, 911
See application file for complete search history.

(56) References Cited

U.S. PATENT DOCUMENTS

| | | | | |
|---|---|---|---|---|
| 3,377,451 | A * | 4/1968 | Kreuter ......................... | 200/308 |
| 4,354,076 | A * | 10/1982 | Lutzenberger ................ | 200/308 |
| 4,796,154 | A * | 1/1989 | Morris et al. ................. | 361/634 |
| 5,140,115 | A * | 8/1992 | Morris .......................... | 200/308 |
| 6,512,669 | B1 | 1/2003 | Goodwin et al. | |
| 6,717,076 | B2 | 4/2004 | Narusevicius et al. | |
| 7,277,294 | B2 | 10/2007 | Carlson | |
| 2012/0273334 | A1 * | 11/2012 | Ganley et al. ................ | 200/400 |

* cited by examiner

*Primary Examiner* — Edwin A. Leon
(74) *Attorney, Agent, or Firm* — Luedeka Neely Group, P.C.

(57) ABSTRACT

Equipment including an assembly structure defining an interior, and including a panel and a viewing window in the panel. An electro-mechanical operating device is located within the interior. The electro-mechanical operating device has at least two visually-distinguishable operational states, and is positioned such that the operational state of the electro-mechanical operating device can be visually observed through the viewing window. An illumination device within the interior emits light of at least two different colors corresponding to the at least two visually-distinguishable operational states of the electro-mechanical operating device. Electrical circuitry includes a switch for sensing the operational state of the electro-mechanical operating device and connected for controlling the illumination device.

8 Claims, 9 Drawing Sheets

ILLUMINATION AND VISUAL INDICATOR

CROSS-REFERENCE TO RELATED APPLICATION

The benefit of U.S. provisional patent application Ser. No. 61/451,416 filed Mar. 10, 2011, and titled "Illumination and Visual Indicator" is claimed, the entire disclosure of which is hereby expressly incorporated by reference.

This is a companion to concurrently-filed U.S. patent application Ser. No. 13/414,250, filed Mar. 7, 2012, titled "Draw Out Control Compartment," which in turn claims the benefit of U.S. provisional patent application Ser. No. 61/451,390, filed Mar. 10, 2011; and to concurrently-filed U.S. patent application Ser. No. 13/414,287, filed Mar. 7, 2012, titled "Racking Contactor," which in turn claims the benefit of U.S. provisional patent application Ser. No. 61/451,407, filed Mar. 10, 2011; the entire disclosures of which are hereby expressly incorporated by reference.

BACKGROUND OF THE INVENTION

The invention relates generally to electro-mechanical operating devices such as manually-operated disconnect/grounding switches connected to machines. A particular example is in modularized feeder circuit control panels including electrical contactor circuits for power distribution centers employed in underground mining activities. Such feeder circuit control panels include a contactor as well as a manually-operated disconnect/grounding switch, the operation of which can be visually observed for safety purposes. However, embodiments of the invention are not limited to that environment or context.

Carlson U.S. Pat. No. 7,277,294 titled "Contactor Draw Out Tray," the entire disclosure of which is hereby expressly incorporated by reference, discloses electrical circuit protector apparatus which has a stationary frame and a movable frame. The stationary frame is housed within a power distribution center and has input terminals for incoming electrical power, and output terminals for delivering electrical power to equipment operating on a feeder circuit, for example equipment in the form of a mining machine including an electric motor. The movable frame is drawer-like and includes a slide-out support tray having a front panel, and may be referred to as a draw out tray. The movable frame or draw out tray carries what may broadly be described as electrical components for the electrical circuit protector, including a disconnect/grounding switch, a contactor and a controller. A particular example of electrical components for the electrical circuit protector is a motor starter. The controller, by way of example, includes logic circuitry, communication circuitry for remote control, and protective relays. The disconnect/grounding switch is part of a mechanism which mechanically locks the movable frame relative to the stationary frame, and in particular ensures that the disconnect switch is open and the output conductors are grounded before the movable frame is drawn out of the stationary frame.

In the apparatus disclosed in Carlson U.S. Pat. No. 7,277,294, a viewing window is provided in the front panel for observing operation of the disconnect/grounding switch. Thus, Carlson U.S. Pat. No. 7,277,294 discloses an example of prior art apparatus which includes a contactor as well as a manually operated disconnect/grounding switch, the operation of which can be visually observed.

SUMMARY OF THE INVENTION

In one aspect, equipment is provided including an assembly structure defining an interior. The assembly structure in turn includes a panel and a viewing window in the panel. An electro-mechanical operating device is located within the interior. The electro-mechanical operating device has at least two visually-distinguishable operational states, and is positioned such that the operational state of the electro-mechanical operating device can be visually observed through the viewing window. An illumination device within the interior emits light of at least two different colors corresponding to the at least two visually-distinguishable operational states of the electro-mechanical operating device. Electrical circuitry includes a switch for sensing the operational state of the electro-mechanical operating device and connected for controlling the illumination device.

In another aspect, equipment is provided including a stationary frame, and a drawer-like movable frame slidably carried on the stationary frame. The drawer-like movable frame includes a front panel and defines an interior. A viewing window is provided in the front panel. A visible disconnect mechanism is supported on the drawer-like movable frame. The visible disconnect mechanism has visually-distinguishable switch-open and switch-closed operational states, and is positioned such that the operational state of the visible disconnect mechanism can be visually observed through the viewing window. An illumination device within the interior is electrically connected so as to emit light of two different colors corresponding to the switch-open and switch-closed operational states.

BRIEF DESCRIPTION OF THE DRAWINGS

FIB. 10 is an enlarged view of a microswitch controlling an illumination device.

DETAILED DESCRIPTION

In overview, in embodiments of the invention lighting is provided which gives illumination for operator observations of electro-mechanical operating devices, as well as color indication of the operating state of electro-mechanical operating devices. Exemplary color indications are RED for ON, and GREEN for OFF.

Embodiments of the invention allow for a more global indication of the status of an operating device and thus the ultimate machine, process, or the like which it is controlling. Illuminating the operating device itself with a universally recognized color is more likely to draw the operator to perform an actual visual inspection of the device, thus providing for a safer operating condition.

Although the invention as disclosed herein is embodied in a motor starter including a manually-operated disconnect/grounding switch such as is disclosed in the above-incorporated concurrently-filed companion application Ser. Nos. 13/414,250 and 13/414,287, both filed Mar. 7, 2012, respectively titled "Draw Out Control Compartment" and "Racking Contactor", the invention is not so limited. Thus the invention may be embodied in a multitude of devices and applications across many technologies.

Figure 1:
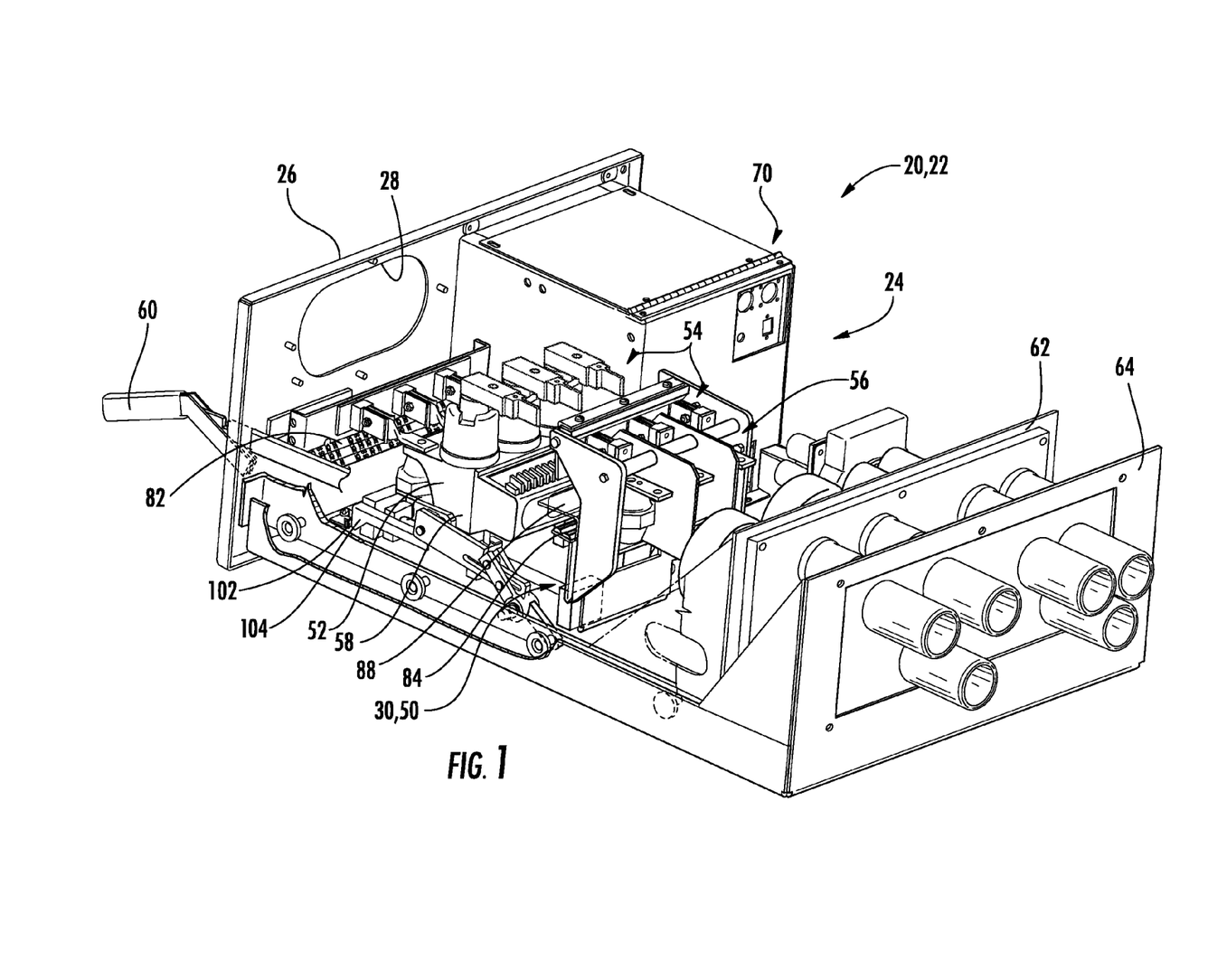
FIG. 1 is a three-dimensional internal view of representative electrical equipment having a viewing window and including an electro-mechanical operating device, by way of representative example, a disconnect/grounding switch visible through the viewing window in an exemplary DISCONNECTED AND GROUNDED state or configuration.
Figure 2:
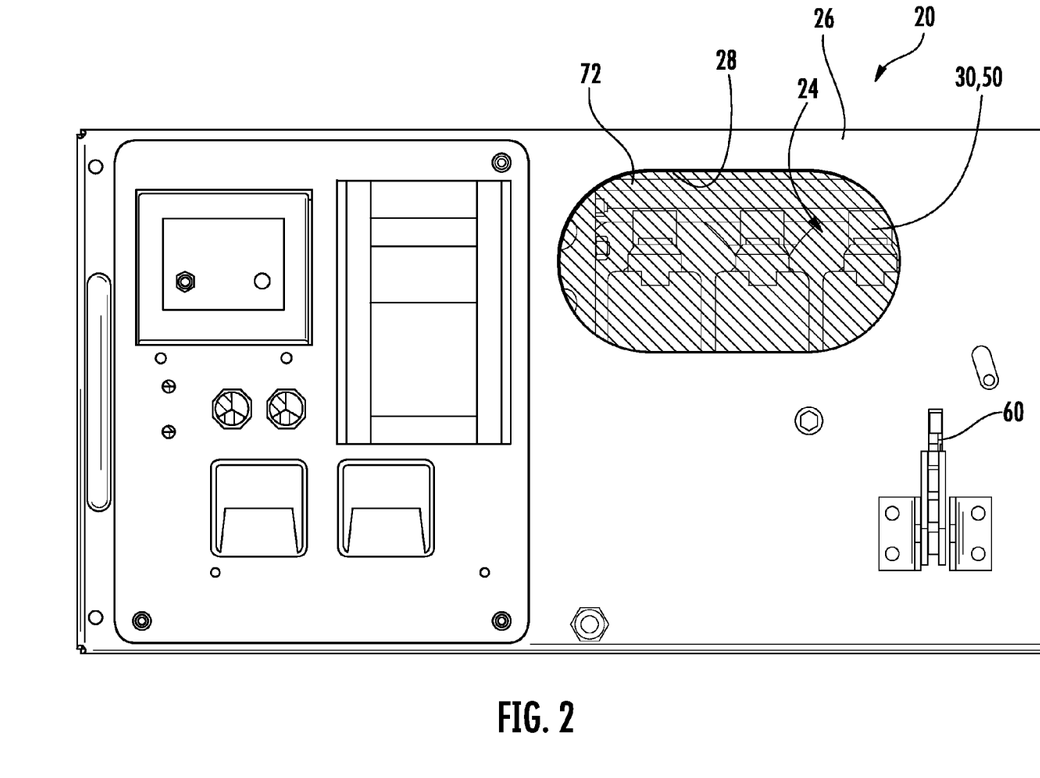
FIG. 2 is a front panel view of the representative electrical equipment of FIG. 1, where internal illumination is GREEN, indicating the status of the exemplary disconnect/grounding in its DISCONNECTED AND GROUNDED state, as well as providing illumination to facilitate observation of the disconnect/grounding switch.

Referring first to FIGS. 1 and 2, representative electrical equipment 20 includes an assembly structure 22 defining an interior 24. The assembly structure includes a front panel 26, and a viewing window 28 in the panel 26. Behind the front panel 26, within the interior 24, is an electro-mechanical operating device 30 having at least two visually-distinguishable operational states. The electro-mechanical operating device 30 is positioned such that the operational state of the electro-mechanical operating device 30 can be visually observed through said viewing window 28.

In the particular embodiment disclosed herein, the electrical equipment 20 is an electrical circuit protector. Within the interior 24 are various circuit protector components, including a disconnect mechanism 50 which integrates a contactor 52 and switch contacts, collectively referred to as switch contacts 54, into what is herein termed a racking contactor 56 which includes a carriage 58, as is disclosed in greater detail in the above-incorporated concurrently-filed companion application Ser. No. 13/414,287, filed Mar. 7, 2012, titled "Racking Contactor."

The disconnect mechanism 50 is representative of a visible disconnect switch, and more generally is representative of the electro-mechanical operating device 30.

The electro-mechanical operating device 30 in the representative form of a disconnect mechanism is operated by a handle 60 on the front of the panel 26. In the illustrated embodiment, operation of the handle 60 moves the carriage 58 of the racking contactor 56 as part of the operation of the racking contactor 56. Although a manually-operated handle 60 is illustrated, the electro-mechanical operating device 30 may as well be operated by a motor or other actuator (not shown). In either event, the operation and mechanical status of the electro-mechanical operating device 30 is observed through the viewing window 28.

In the illustrated embodiment, the electrical equipment 20 includes a drawer-like movable frame generally designated 62 slidably received in a stationary frame 64, as is described in greater detail in the above-incorporated companion application Ser. No. 13/414,287, filed Mar. 7, 2012, titled "Racking Contactor." The drawer-like moveable frame 62 may be viewed as the assembly structure 22 defining an interior 24, and including the front panel 26, and the viewing window 28. Mounted to and carried by the drawer-like moveable frame 62, behind the front panel 26, are the various circuit protector components, including the disconnect mechanism 50 representative of the electro-mechanical operating device 30.

Also within the interior 24 is a illumination device, generally represented at 70. The illumination device 70 may take the form of one or more individual light sources such as incandescent lamps or light-emitting diodes (LEDs). In some prior art apparatus, an illumination device simply provides white light to facilitate observation of a disconnect/grounding switch. For safety purposes, particularly to ensure that the switch contacts are in fact open and the circuit grounded when the switch handle 60 is operated to disconnect the circuit (in other words, to ensure that no mechanical failure has occurred), it is important to be able to clearly observe operation of the electro-mechanical operating device 30 through the viewing window 28.

More particularly, in the configuration of FIGS. 1 and 2, the switch handle 60 is pivoted down to its switch "OPEN" position. Internal illumination provided by the illumination device 60 is GREEN, represented by the shading 72 of the viewing window 28 in FIG. 2, indicating the status of the disconnect mechanism 50 viewed through the window 28 as in its DISCONNECTED AND GROUNDED state.

Figure 3:
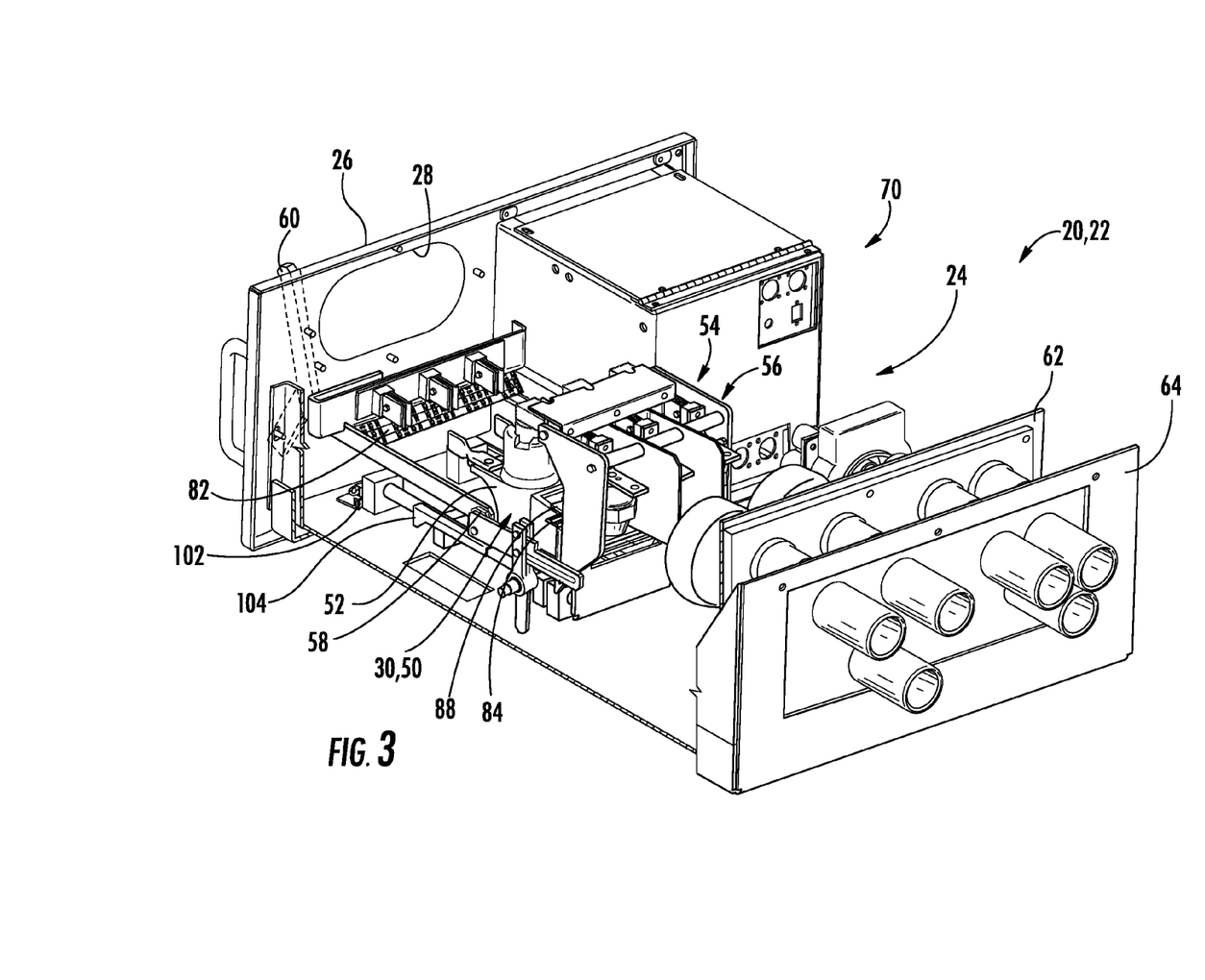
FIG. 3 is a three-dimensional internal view in the same orientation as FIG. 1, showing the representative disconnect/grounding switch visible through the viewing window in an exemplary CLOSED or OPERATING state or configuration.
Figure 4:
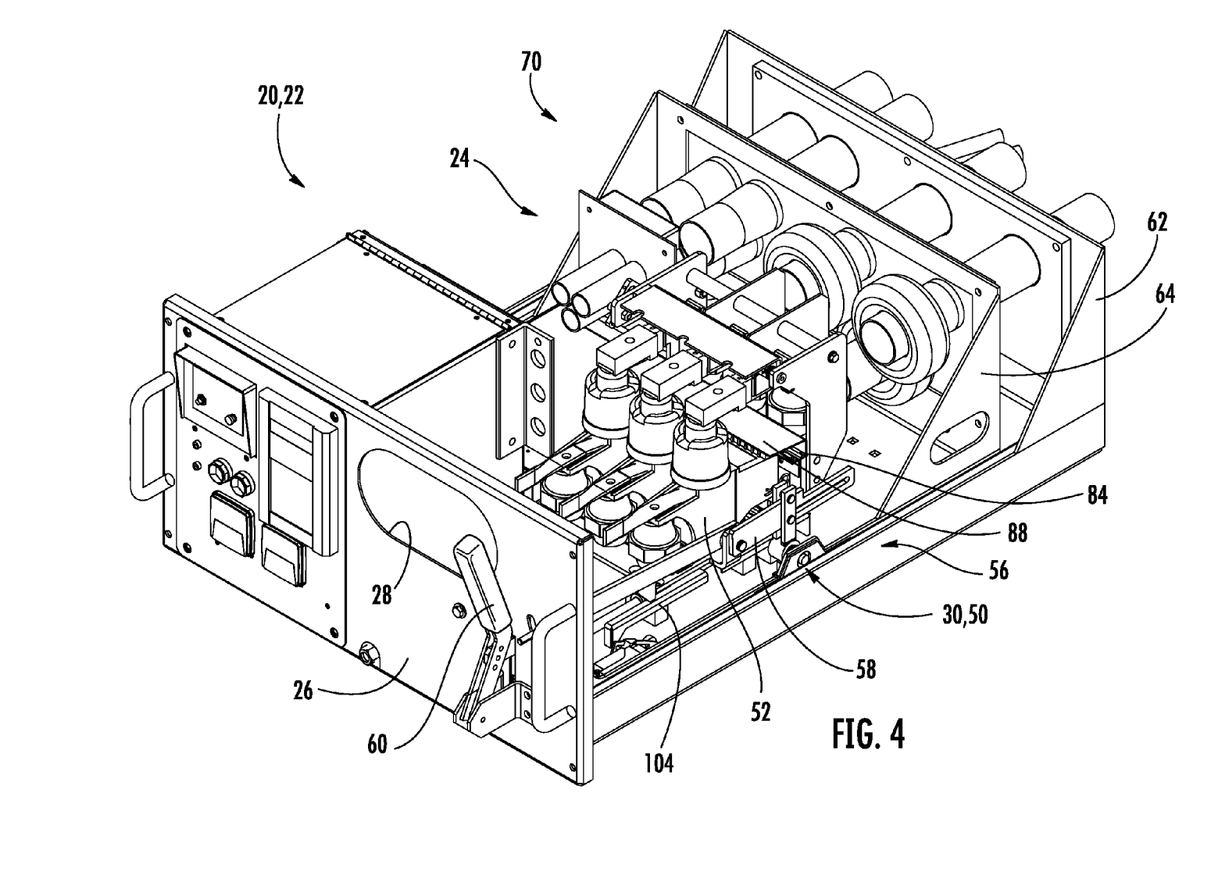
FIG. 4 is a three-dimensional internal view in a different orientation, showing the representative disconnect/grounding switch visible through the viewing window in an exemplary CLOSED or OPERATING state or configuration as in FIG. 3.
Figure 5:
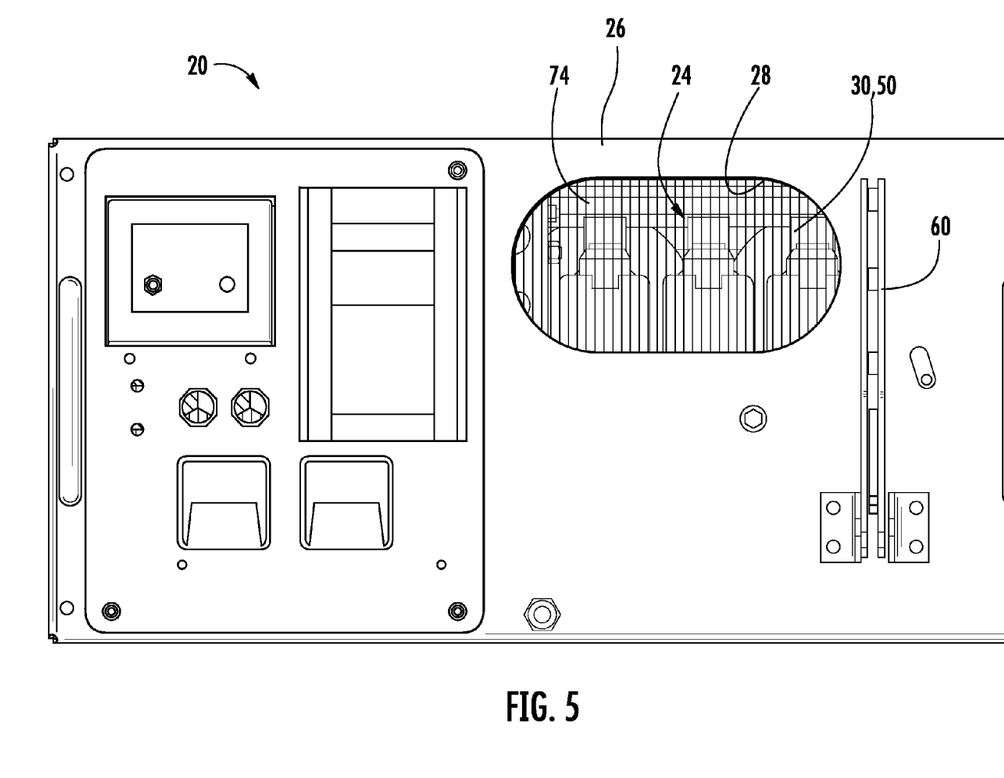
FIG. 5 is a front panel view of the representative electrical equipment device of FIGS. 3 and 5, where internal illumination is RED indicating the status of the exemplary disconnect/grounding switch in its CLOSED or OPERATING state, as well as providing illumination to facilitate observation of the disconnect/grounding switch.

FIGS. 3, 4 and 5 illustrate the electrical equipment 20 with the switch handle 60 is pivoted up to its switch "CLOSED" position. Internal illumination provided by the illumination device 70 is RED, represented by the shading 74 of the viewing window 28 in FIG. 5, indicating the status of the disconnect mechanism 50 viewed through the viewing window 28 as in its CLOSED or OPERATING state.

Figure 6:
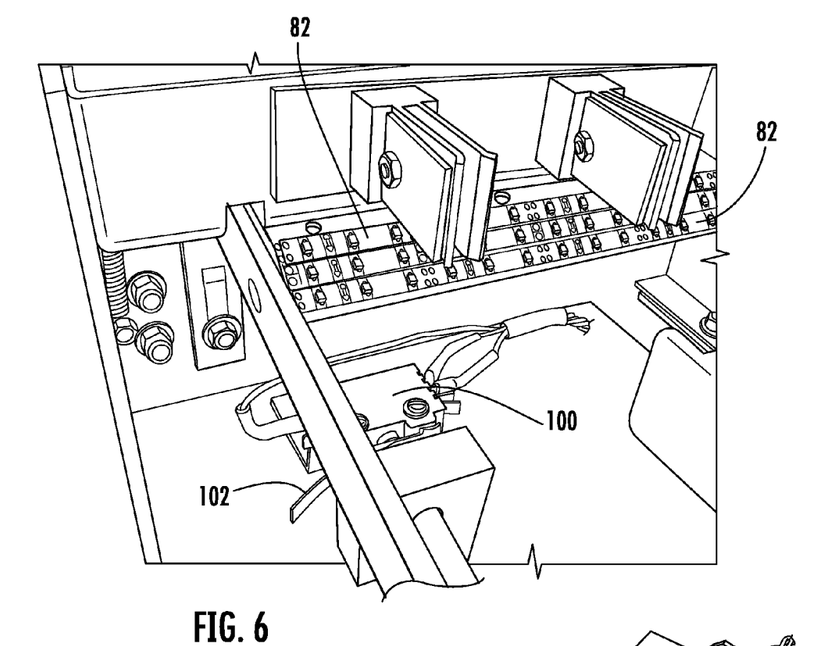
FIG. 6 is a three-dimensional view illustrating a first particular illumination device in the representative form of a three-row LED assembly inside and near the front of the representative electrical equipment.
Figure 7:
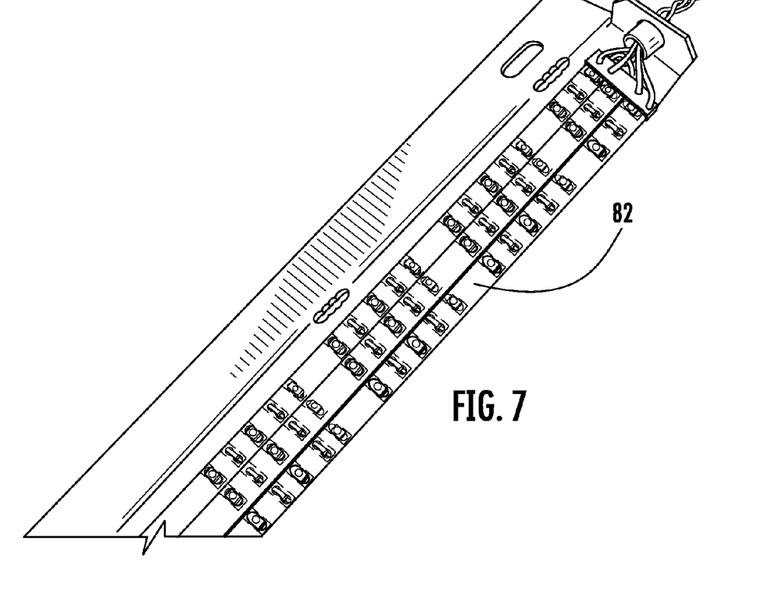
FIG. 7 illustrates a portion of the first illumination device in isolation.
Figure 8:
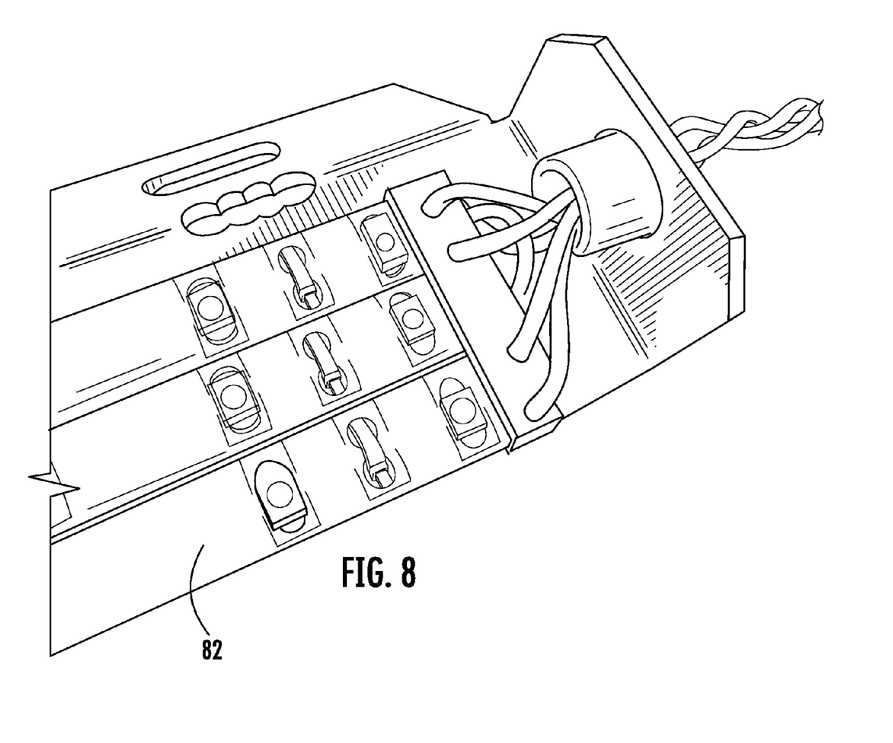
FIG. 8 is an enlarged view thereof.
Figure 9:
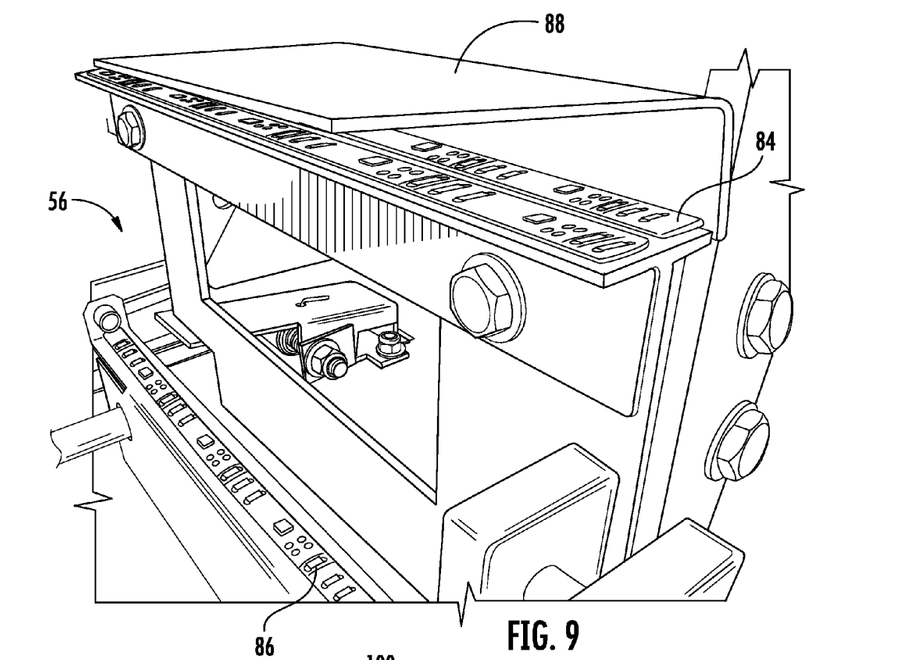
FIG. 9 is a three-dimensional view illustrating a second particular illumination device in the representative form of a two-row LED assembly, and a third particular illumination device in the representative form of a single-row LED assembly.

In the illustrated embodiment, the illumination device 70 takes the form of three particular illumination devices, a first illumination device 82, a second illumination device 84 and a third illumination device 86, which more particularly are three individual LED assemblies 82, 84 and 86. The LED assembly 82 is a three-row assembly, the position of which is shown in FIGS. 1 and 3, near the front of the assembly structure 22, just behind the front panel 26. The positioning and mounting of the first illumination device 82 is shown in enlarged detail in FIG. 6, and portions of the assembly are further detailed in FIGS. 7 and 8.

The second and third illumination devices 84 and 86 are positioned generally above and below the disconnect mechanism 50, as shown in FIG. 4. More particularly, the second, two-row LED assembly 84 is positioned near the top of the contactor 52 underneath a transparent plastic shield 88 so as to illuminate the switch contacts 54. The third illumination device 86 is positioned below, also so as to illuminate the switch contacts 54.

The individual LED assemblies 82, 84 and 86 include current-limiting resistors in series with red and green LEDs in a conventional manner. Individual LED strips are mounted on suitable brackets. In a typical assembly, a row of red LEDs is positioned between two rows of green LEDs.

Figure 10:
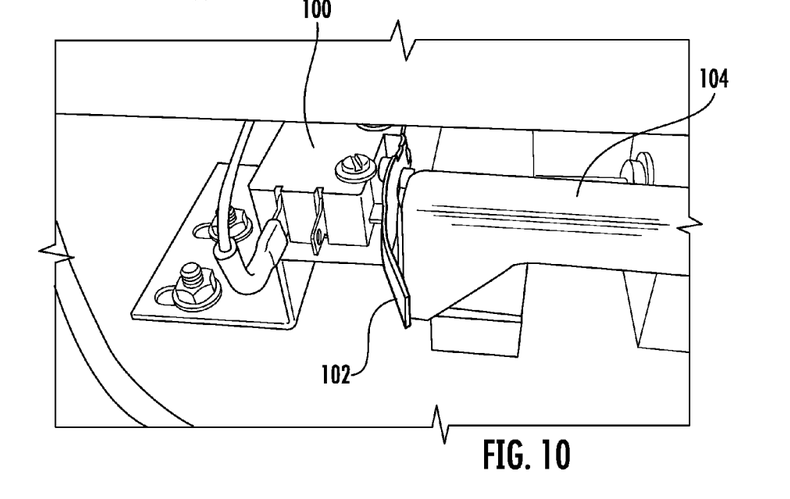

For controlling operation of the illumination device 70, and in particular the three LED assemblies 82, 84 and 86, a switch 100 (FIGS. 6 and 10) is provided. In the illustrated embodiment, a switch 100 having electrical contacts is employed, such as a microswitch 100. However, other forms of switch may be employed as the switch 100, such an optical switch (not shown) where a light beam is interrupted by mechanical movement, or a magnetic proximity switch. In the illustrated embodiment, the microswitch 100 has an actuating arm 102 positioned so as to be actuated by a portion 104 of the carriage 58 of the racking contactor 56, as the switch handle 60 is pulled down, and the carriage 58 moves towards the front panel 26 to place the disconnect mechanism 50 in its disconnected and grounded state.

Figure 11:
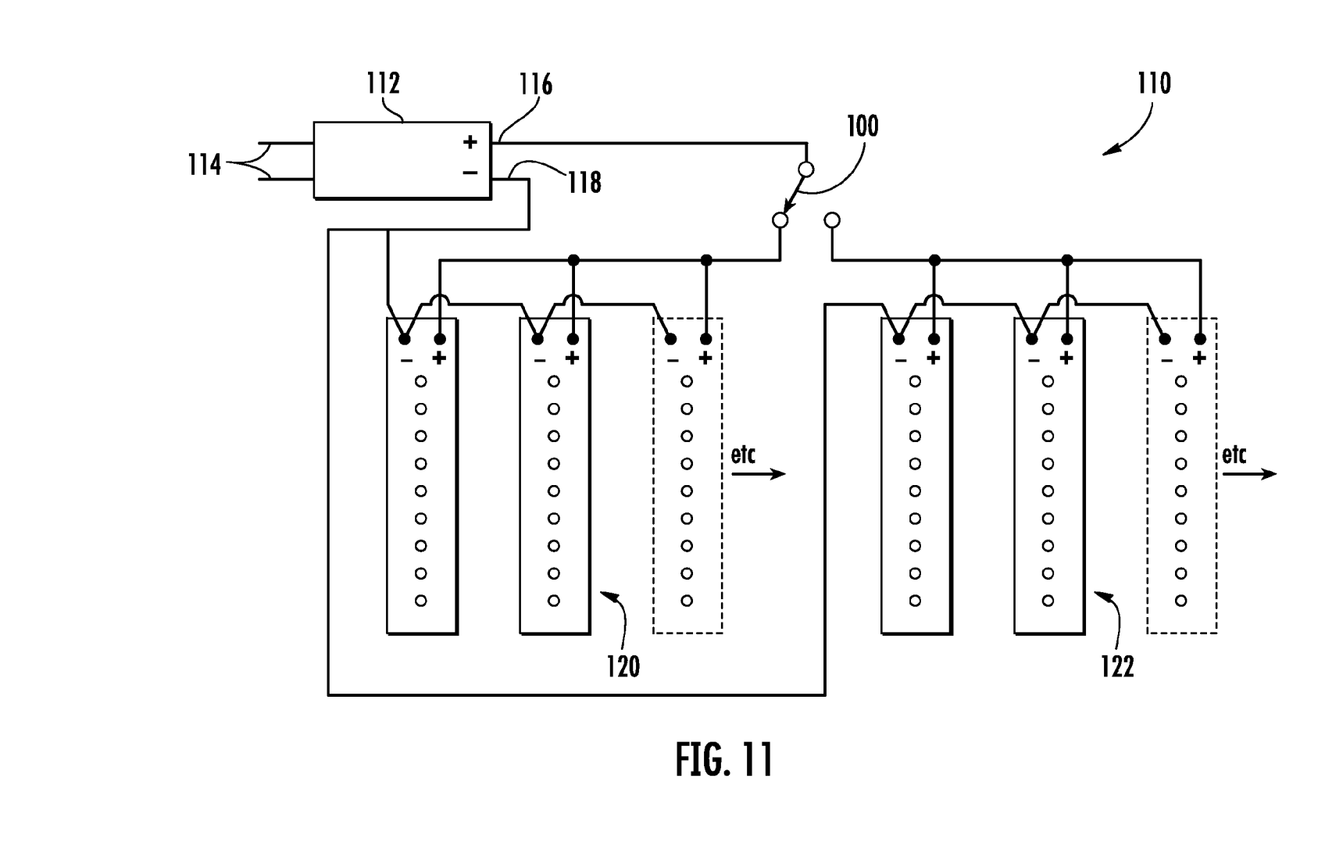
FIG. 11 is an electrical schematic circuit diagram of an illumination circuit.

Referring finally to FIG. 11, an illumination circuit 110 includes the microswitch 100, which is a SPDT switch. An LED driver power supply 112 receives power at input terminals 114, and provides DC output at positive and negative output terminals 116 and 118 respectively. Representative red and green LED light strips 120 and 122 are shown, connected so as to be selectively energized depending on the state of the microswitch 100.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Equipment comprising:
    an assembly structure defining an interior, said assembly structure including a panel and a viewing window in said panel;
    an electro-mechanical operating device within said interior, said electro-mechanical operating device having at least two visually-distinguishable operational states;
    said electro-mechanical operating device being positioned such that the operational state of said electro-mechanical operating device can be visually observed through said viewing window;
    an illumination device within said interior, said illumination device operating from an electrical power source and actively emitting light of at least two different colors corresponding to the at least two visually-distinguishable operational states of said electro-mechanical operating device; and
    electrical circuitry including a switch for sensing the operational state of said electro-mechanical operating device and connected for controlling said illumination device.

2. The equipment of claim 1, wherein said electro-mechanical operating device comprises a visible disconnect switch.

3. The equipment of claim 2, wherein said illumination device provides green illumination when said visible disconnect switch is open, and red illumination when said visible disconnect switch is closed.

4. Equipment comprising:
    a stationary frame;
    a drawer-like movable frame slidably carried on said stationary frame, said drawer-like movable frame including a front panel and defining an interior;
    a viewing window in said front panel;
    a visible disconnect mechanism supported on said drawer-like movable frame, said visible disconnect mechanism having visually-distinguishable switch-open and switch-closed operational states, and said visible disconnect mechanism being positioned such that the operational state of said visible disconnect mechanism can be visually observed through said viewing window; and
    an illumination device within said interior, said illumination device operating from an electrical power source and electrically connected so as to actively emit light of two different colors corresponding to the switch-open and switch-closed operational states.

5. The equipment of claim 4, wherein said illumination device provides green illumination when said visible disconnect/grounding switch is in its switch-open operational state, and red illumination when said visible disconnect/grounding switch is in its switch-closed operational state.

6. The equipment of claim 4, which further comprises electrical circuitry including a switch for sensing the operational state of said visible disconnect/grounding switch and connected for controlling said illumination device.

7. The equipment of claim 6, wherein said switch for sensing comprises a switch having electrical contacts.

8. Equipment comprising:
    an assembly structure defining an interior, said assembly structure including a panel and a viewing window in said panel;
    an electro-mechanical operating device within said interior, said electro-mechanical operating device having at least two visually-distinguishable operational states;
    said electro-mechanical operating device being positioned such that the operational state of said electro-mechanical operating device can be visually observed through said viewing window; and
    an illumination device within said interior, said illumination device operating from an electrical power source and connected so as to actively emit light of two different colors respectively corresponding to the operational states.

* * * * *